UNITED STATES PATENT OFFICE.

ISAAC J. WHITLATCH, OF LEXINGTON, INDIANA, ASSIGNOR OF ONE-HALF HIS RIGHT TO ALONZO A. MORRISON, OF SAME PLACE.

IMPROVEMENT IN RECIPROCATING CHURN-DASHERS.

Specification forming part of Letters Patent No. 166,436, dated August 3, 1875; application filed June 26, 1875.

*To all whom it may concern:*

Be it known that I, ISAAC J. WHITLATCH, of Lexington, in the county of Scott and in the State of Indiana, have invented certain new and useful Improvements in Churns; and do hereby declare that the following is a full, clear, and exact description thereof, reference being had to the accompanying drawings and to the letters of reference marked thereon, making a part of this specification.

The nature of my invention consists in the construction and arrangement of a churn-dasher, as will be hereinafter more fully set forth.

The accompanying drawing represents a longitudinal section of my improved churn-dasher.

A represents a circular perforated base of suitable dimensions, secured to the dasher-rod B. C C represent two semicircular wings, placed on the base A on opposite sides of the rod or handle B. The straight sides of the wings rest against the handle, while the circular sides are placed on the base, so as to form an angle of about forty-five degrees. The wings are also perforated, as shown.

The churn-dasher thus constructed may be made of wood or other suitable material, and it is operated up and down within the churn in the usual manner.

As the milk passes through the holes in the base A it dashes against the wings at such an angle as to deflect in such a direction as to strike against the other wings, or, if it should strike the holes in the wings, its velocity is so increased as to make it beat severely against the sides of the churn, while the milk that does not pass through the holes in the wings passes out at the sides with great facility. The currents and counter-currents thus produced constitute an agitation of sufficient force to churn the milk in very short time.

The angular position of the wings and the holes therein make the dasher easy to raise.

The dasher is cheap and durable, and not liable to get out of order.

Having thus fully described my invention, what I claim as new, and desire to secure by Letters Patent, is—

The within-described churn-dasher, consisting of circular perforated base A, with rod or handle B, and the perforated semicircular wings C C, placed thereon at an angle, substantially as and for the purposes herein set forth.

In testimony that I claim the foregoing I have hereunto set my hand this 25th day of May, 1875.

ISAAC J. WHITLATCH.

Witnesses:
 C. L. EVERT,
 A. W. AMICK.

H. K. WHITE.
Reed-Organs.
No. 166,437. Patented Aug. 3, 1875.
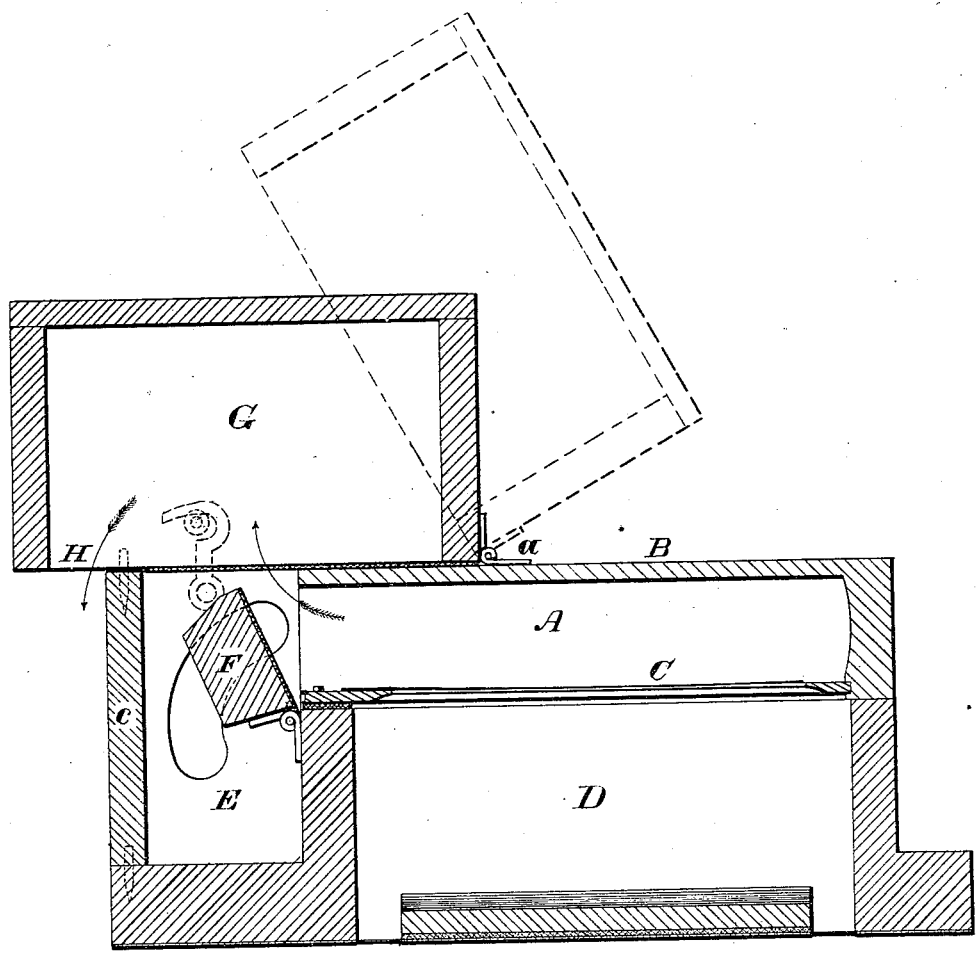
Witnesses:
Arthur C. Fraser.
Thomas Heigham
Inventor:
Henry K. White,
By his Attorneys,
Burke & Fraser